United States Patent [19]

MacDonald

[11] 3,956,887
[45] May 18, 1976

[54] GAS TURBINE ENGINES

[75] Inventor: Alan George MacDonald, Bristol, England

[73] Assignee: Rolls-Royce (1971) Limited, London, England

[22] Filed: Nov. 11, 1974

[21] Appl. No.: 522,846

[30] Foreign Application Priority Data
Nov. 15, 1973 United Kingdom............... 53135

[52] U.S. Cl.................................. 60/39.2; 415/181
[51] Int. Cl.² ............................................ F02C 9/00
[58] Field of Search........................ 60/39.2, 39.03; 415/181

[56] References Cited
UNITED STATES PATENTS

| | | | |
|---|---|---|---|
| 2,870,958 | 1/1959 | Pinsley | 415/181 UX |
| 2,935,246 | 5/1960 | Roy | 415/181 |
| 2,974,927 | 3/1961 | Johnson | 415/181 |
| 2,989,843 | 6/1961 | Ferri | 415/181 UX |
| 3,442,441 | 5/1969 | Dettmering | 415/181 X |
| 3,804,335 | 4/1974 | Sohre | 415/181 X |

Primary Examiner—Clarence R. Gordon
Attorney, Agent, or Firm—Stevens, Davis, Miller & Mosher

[57] ABSTRACT

A core engine or gas generator for use in a range of gas turbine engines, which consist of a multi-stage compressor and a single stage supersonic turbine, the compressor and turbine being mouned on a single shaft. The compressor includes a number of stages of variable angle and the gas generator has an annular combustion chamber.

10 Claims, 12 Drawing Figures

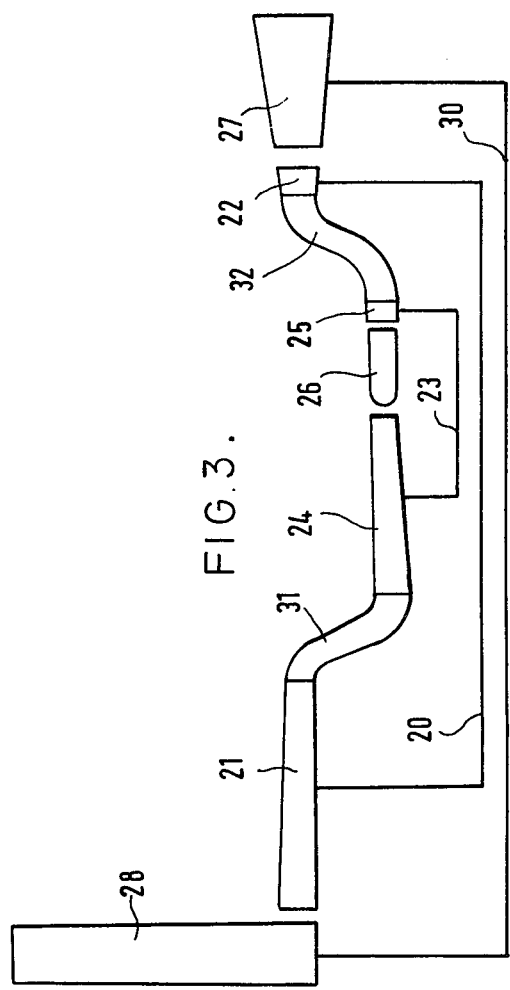
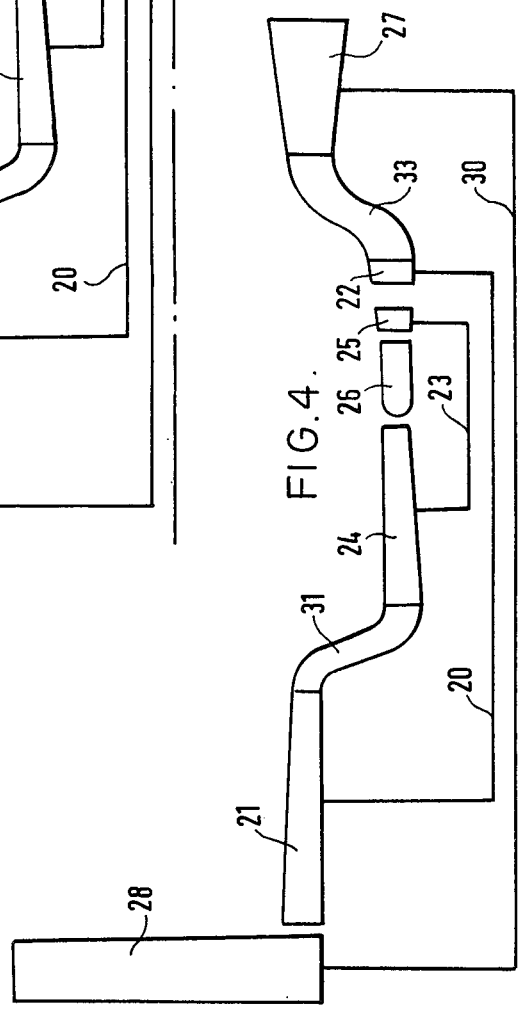

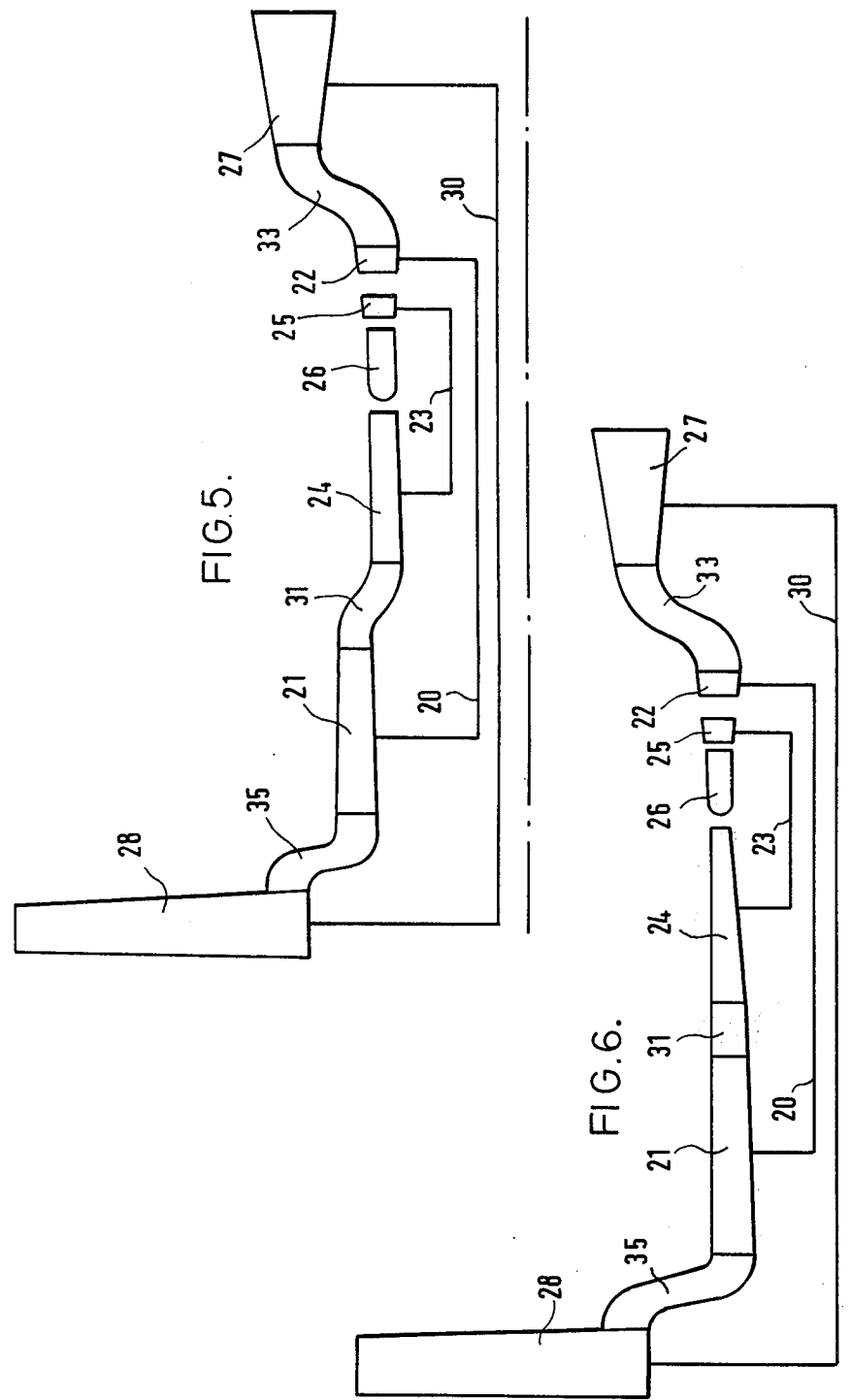

GAS TURBINE ENGINES

The present invention relates to improvements in gas turbine engines.

Gas turbine engines, when first used for aircraft propulsion, were of the turbojet type in which the whole of the air entering the engine passes through one or more compressors, a combustion system, one or more turbines and is discharged through an exit nozzle as a high velocity, high temperature gas stream. This "first generation" of aircraft gas turbine engines gave advantages over the piston engines which they superseded. Turbojet engines have continued to be used particularly for military aircraft. The high jet velocity makes the engine objectionably noisy but this and the high fuel consumption can be tolerated in military use.

A "second generation" of aircraft gas turbine engines was then developed and these were of the turbofan type. In these engines only a portion of the air entering the engine passes through the compression system, the combustion system and the turbine system, while the remaining air receives some compression and is delivered down a duct which bypasses the remainder of the engine. This bypass air then exits as a slow speed, relatively large mass of cold air surrounding the hot jet which is exiting from the turbine system. The ratio of the mass of cold air passing down the bypass duct to the mass of cold air which eventually forms the hot jet, is known as the bypass ratio. In the "second generation" of gas turbine engines this ratio was of the order of 1:1. Engines of this generation gave an improvement of about 15% in specific fuel consumption over the original turbojets.

There is now in use a "third generation" of gas turbine engines. These are turbofan engines and they have bypass ratios of the order of 5:1. They have a compression system which includes a large fan driven on a separate spool or shaft while the remaining part of the compression system, along with the combustion system and turbine system form what is known as the core engine or gas generator. The core engine in some engines consists of two spools, namely an intermediate pressure compressor driven by an intermediate pressure turbine and a high pressure compressor driven by a high pressure turbine. The fan, of course, is mounted on a low pressure spool driven by a low pressure turbine.

In other engines the core consists of only one spool and the necessity for either one or two spools for the core depends on how well the whole engine is required to perform a wide variety of operating functions.

Up to now designers of "third generation" engines have contented themselves with designing different engines for different operating roles. Thus, there is a small number of engines which have been specifically designed for powering large subsonic transport aircraft. The core engines of these aircraft engines have either one or two spools depending upon the way the designers have chosen to select certain parameters. However, these core engines are not generally suitable for use in other engines for different aircraft applications.

It has always been the aim of aircraft engine designers to design engines which can be used in a number of different roles. Unfortunately, this is very difficult because the different requirements of different roles make such designs almost impossible to achieve.

The present invention is a result of the consideration as to whether it would be possible for a single core engine or gas generator to be developed which could be applied to a series of different gas turbine engines, each different engine being fully suitable for a different application and all the engines having the single common gas generator. In the past all gas generator designs have tended to be a compromise which was unsatisfactory in one respect or another for each different overall gas turbine engine and the present invention provides a single gas generator which is surprisingly ideally suited to a number of different aircraft engines.

According to the present invention a gas turbine core engine or gas generator comprises a rotatably mounted multi-stage compressor, the stages of which are interdigitated with stages of stator vanes, at least one stage of which is a variable angle stage, an annular combustion chamber, and a single stage supersonic turbine as herein defined, both the turbine and the compressor being rotatably mounted upon a single common shaft.

The present invention can be best understood by a consideration of the current designs of core engines or gas generators and a number of these as well as some possible modifications of them are shown in FIGS. 1 to 6 which are all diagrammatic longitudinal half-sections through gas turbine engines.

The constraints on a core engine or gas generator necessitate a relatively small diameter. These constraints, as applied to the compressor, are:
a. blade loading, that is work done per unit area of the blade,
b. blade speed, and with current technology there is a practical limit of about Mach 1.2, and
c. a limit on the hub-tip ratio, that is the ratio of the hub or disc diameter to the blade tip diameter.

For a given blade material the maximum loading is known; working below this loading means the unnecessary use of blade material which gives unneeded weight. The maximum loading determines the blade area and practical limits determine the width and length to achieve this area. Given, in this way, the blade width, length and speed the hub-tip ratio is determined.

The constraints applying to a turbine are:
a. blade centrifugal stress, which is a function of blade weight and speed,
b. disc rim stress, which is related to rim speed,
c. a limit on the hub-tip ratio.

These constraints on compressor and turbine mean that the gas generator is restricted to a small diameter and that to use it in combination with a fan mounted on a mechanically separate spool, which has operative parts of a larger diameter, requires an annular swan neck connection both between the fan and the gas generator compressor and between the gas generator turbine and the turbine driving the fan.

There are then two possible arrangements of gas generator both of which have been tried. The first of these is shown in FIG. 1 which shows diagrammatically a complete engine in which the gas generator has a single spool 10, having a compressor 11 and a two stage subsonic turbine 12, and the gas generator is used to drive a fan turbine 13 which in turn drives a fan 14 on a spool 15. A combustion system 16 is provided. Because the gas generator diameters are limited by the constraints explained above it is necessary to provide an annular swan neck connection 17 between the fan 14 and the entry to compressor 11 and a further annular swan neck connection 18 between the gas generator turbine 12 and the fan turbine 13.

The second arrangement is shown in FIG. 2 which also shows diagrammatically a complete engine and in this diagram the gas generator has two spools. The first of these spools is an intermediate pressure (IP) spool 20 having an intermediate compressor 21 driven by an intermediate pressure turbine 22 and the second spool is a high pressure (HP) spool 23 having a high pressure compressor 24 driven by a high pressure turbine 25; a combustion system 26 is provided. The gas generator drives a fan turbine 27 which in turn drives a fan 28 via a spool 30. In this arrangement annular swan neck connections are required and these are provided at 31 between the IP and HP compressors and at 32 between the HP and IP turbines.

The alternative design philosophies of these two gas generators shown in FIGS. 1 and 2 reflect two alternative approaches to the same problem and thus, for example, in the single spool gas generator of FIG. 1 the pressure ratio across compressor 11 will be of the order of 16:1 while in the gas generator of FIG. 2 the pressure ratio across each of the compressors 21 and 24 will be of the order of 4:1, giving an overall pressure ratio of 16:1.

These two approaches to the construction of gas generators are currently employed in different high bypass ratio subsonic engines of the third generation. In attempting to develop either of these engines further one seeks a gas generator giving better performance than these two alternatives and in particular a gas generator giving the ability for adaptation to a number of different engines.

Considering first the possible development of the two spool gas generator of FIG. 2, further output from the gas generator can only be achieved by a higher compressor delivery. This can be achieved by gradual improvement in blade shapes and the aerodynamics of the compressor generally but it leads to a higher compressor delivery temperature and causes the HP spool to become smaller. Thus the swan neck ducts become more pronounced and the turbine duct 32 becomes hotter and within current technology it is impossible to design without excessive cooling. The demands of such cooling are such that the amount of air required to be bled from the compressor for cooling cancels, in a large measure, the benefit achieved by improvements in the compressor delivery. Tthe arrangement of the gas generator with this development is illustrated in FIG. 3.

To overcome the problem of cooling the turbine duct it is necessary to move the IP turbine 22 and place it immediately behind the HP turbine 25. This arrangement is shown in FIG. 4 and it will be seen that ducting is now provided at 33 between the IP turbine 22 and the fan turbine 27. However, the reduction in diameter of the IP turbine means that its blade speed is significantly reduced and the blades become aerodynamically overloaded. To solve this problem it is possible to provide a two stage IP turbine or to increase the speed of the IP shaft. Considering the first of these alternatives, the two stage IP turbine would add considerable weight and would require further cooling air which would again cancel much of the advantage gained from its use. For the second alternative, that is an increase in the IP spool speed, the constraint of compressor tip speed requires that the IP compressor diameter should be reduced also and this shortens the swan neck between the HP and IP compressor but requires another swan neck 35 between the fan 28 and the IP compressor 21 as shown in FIG. 5. Further increases in performance in the gas generator require further reductions in the IP compressor diameter until the stage is reached, as illustrated in FIG. 6, in which the diameter of the IP compressor 21 at its delivery equals the diameter of the HP compressor 24 at its inlet and the speeds of the two shafts become substantially equal. There is then no logic in having separate IP and HP shafts and the two can be combined back into the single spool gas generator shown in FIG. 1.

The present invention is illustrated in FIGS. 7 to 12 in which:-

Figure 7:
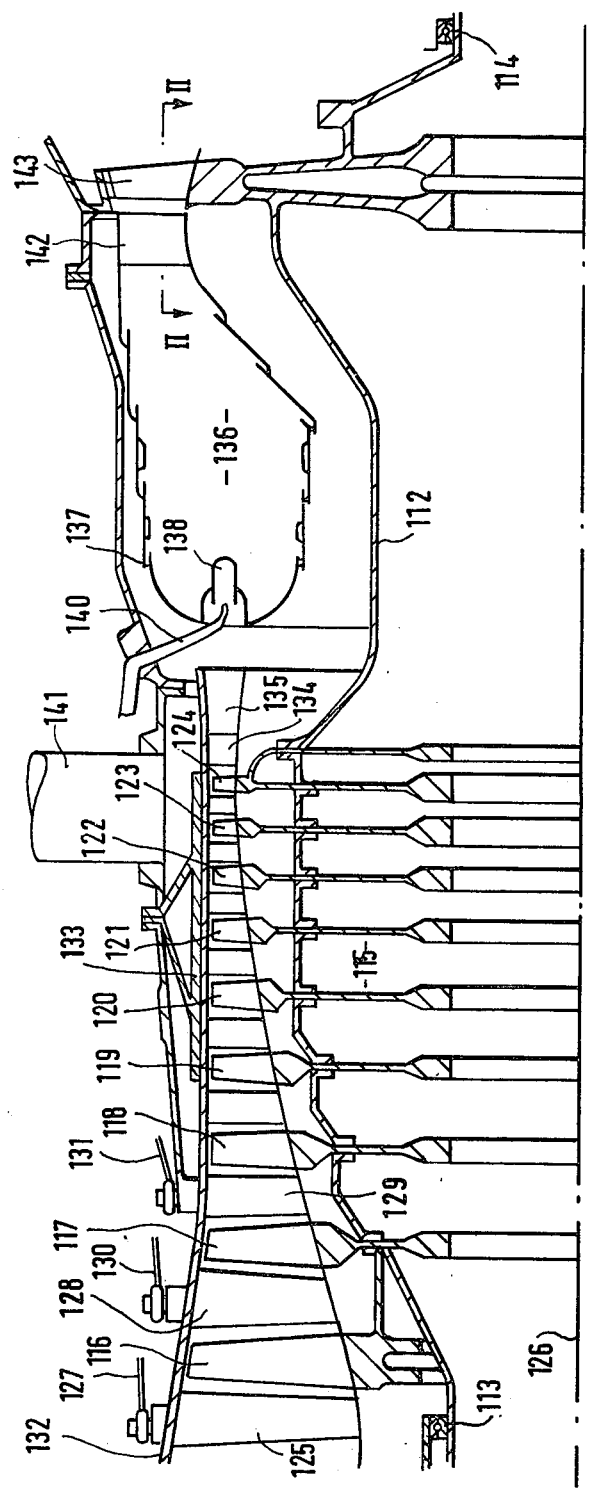
FIG. 7 is a vertical longitudinal section through a gas generator constructed in accordance with the invention.

Referring to FIG. 7, a gas turbine core engine or gas generator is shown which comprises a single rotatably mounted shaft 112 supported on bearings 113, 114. The shaft includes a high pressure compressor shown generally at 115 which has nine stages of radially extending compressor blades shown at 116 to 124 respectively.

Arranged upstream of the first stage 116 of compressor blades is a radially extending circumferential array of pivotally mounted inlet guide vanes 125 which are adapted to be pivoted about their longitudinal axes (that is to say their respective axes which lie radially of the rotational axis 126 of the engine) by means of levers, one of which is shown at 127. Provided between compressor stages 116 and 117, and 117 and 118 are further arrays of radially extending pivotally mounted stator vanes 128 and 129 respectively, which are also adapted to be pivoted about their longitudinal axes by levers, two of which are shown at 130 and 131. It will be appreciated that the levers 127, 130 and 131 are connected to a common linkage (not shown) such that the inlet guide vanes 125 and stators 128 and 129 may be pivoted simultaneously.

The last six stages of the compressor (numbered 119 to 124 respectively) each have a stationary row of stator vanes upstream of them. All the stator blades are mounted on a casing 132 and a portion 133 of the casing, which lies around the stages 119 to 124, is radially adjustable by means shown diagrammatically in the drawing (but which are well-known to those versed in the art) such that during operation of the compressor the clearance between the tips of the compressor blades and the casing 133 may be kept within closely defined limits. This is of major importance in a high performance compressor where the stages having the smallest blades and the highest pressures have tip gaps which are large in relation to the blade length and can lose a significant proportion of their delivery by poor tip gap control.

The delivery of the compressor is passed through a final stator or outlet guide vane 134 into a diffuser 135 to an annular combustion chamber 136. A portion of the air delivered by the compressor passes around the inner and outer sides of the combustion chamber 136 and enters through rings of cooling holes 137 to provide film cooling on the inside of the chamber. However, the majority of the air passes through a burner 138 which is supplied with fuel through a fuel pipe 140 to provide an air/fuel mixture for the combustion in the chamber 136. Some of the compressor delivery is bled off through duct 141 to supply compressed air for cooling and other purposes.

Figure 8:
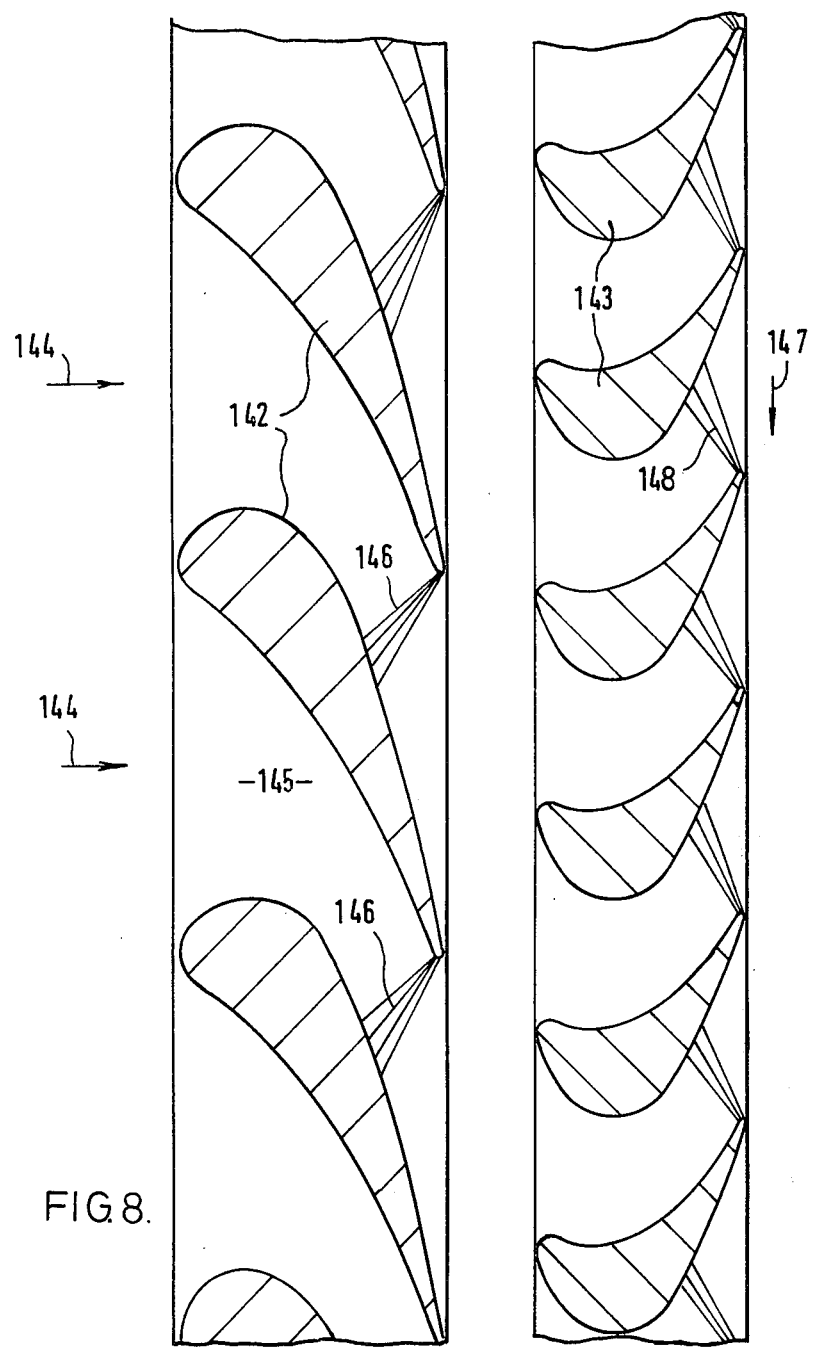
FIG. 8 is a developed plan taken along the line II - II of FIG. 7.

The combustion chamber 136 delivers the products of combustion to an annular row of nozzle guide vanes 142 which direct the flow onto a single stage of turbine blades 143. FIG. 8 shows the section of the vanes 142 and blades 143. The flow entering vanes 142 is turned by these vanes through a substantial angle from its original direction, shown by arrows 144, in which it is travelling on leaving the combustion chamber 136. The flow velocity is increased in the passages 145 between vanes 142 and the flow becomes supersonic creating an expansion front shown at 146. As the flow leaves the nozzle guide vanes it continues to accelerate and it enters the turbine at a substantial supersonic linear velocity relative to the stationary surrounding parts of the gas generator. However, because the turbine itself is rotating in the direction of arrow 147 the velocity of the flow relative to the turbine blades in subsonic. The flow leaving the turbine exit throat is supersonic relative to the blades 143 and this causes a further expansion front 148 to be generated. In this specification and in the appended claims the term "supersonic turbine" is intended to mean a turbine which operates in the above-described manner.

Returning now to the argument developed in relation to FIGS. 1 to 6, it can be seen that possible developments of a single spool gas generator have not been discussed. Having concluded that two spool gas generators could not be further developed we considered what developments could be made to the single spool gas generator and made the surprising discovery that the use of a supersonic turbine enabled the single compressor to be driven and gave a combination which significantly reduced the weight of the gas generator while retaining further development potential at the same or better efficiencies and specific performances. This is the gas generator we have now described and shown in FIGS. 7 and 8.

Figure 1:
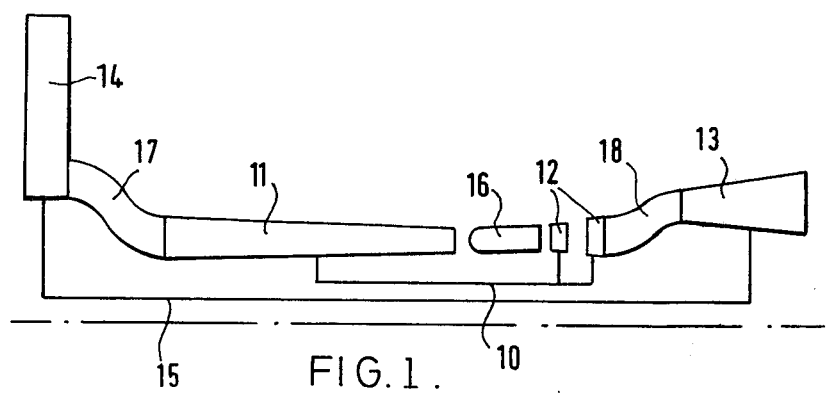
Figure 2:
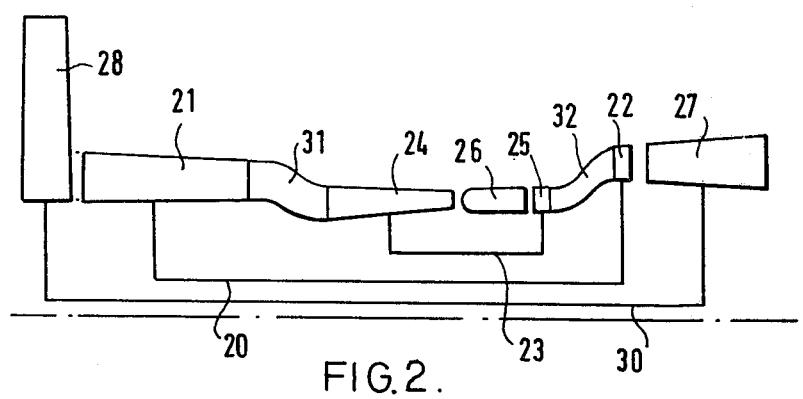

The gas generator shown in FIG. 1 includes a two stage subsonic turbine and further development of this gas generator would have necessitated an additional stage of turbine blades because the two stages illustrated had reached the limits available with present designs and present materials. By changing to a supersonic turbine there is a significant drop in the temperature of the gases passing over the turbine as compared with a subsonic turbine. This is because the expansion ratio across the supersonic turbine is of the order of 4:1 compared with an expansion ratio of the order of 2:1 across a subsonic turbine. This means that the turbine material, being at a lower temperature, can be worked harder, that is to say the work per unit weight of turbine material can be higher than in a subsonic turbine. This change in temperature is accompanied by an increase in the nozzle guide vane temperature but because this vane is stationary better cooling can be provided and better temperature-resistant materials used in this vane. Also, the design of a turbine blade needed for supersonic flow is much thicker than for subsonic blades and this additional thickness enables much more efficient cooling to be achieved.

However, in selecting a supersonic turbine there is one disadvantage which is inherent in such turbines but which in this case turns out to be an advantage. This apparent disadvantage is the fact that, because the pressure ratio across a supersonic turbine is much higher than that across a subsonic turbine, the work output is higher and a larger load must be found to absorb this work output. The turbine must be worked very hard in order to maintain the supersonic velocities in it and to maintain the high efficiency of the supersonic turbine and thereby reap the benefit of using supersonic flow. With low pressure ratio compressors the work demand is insufficient to load a supersonic turbine so that it works efficiently. However, a high pressure ratio compressor requires a very large work input to achieve satisfactory efficiencies and this matches the high work output required from the supersonic turbine. It is this discovery of the natural matching of compressor and turbine which has enabled us to develop the present invention and which gives a significant advance in weight reduction in gas generator technology.

Figure 9:
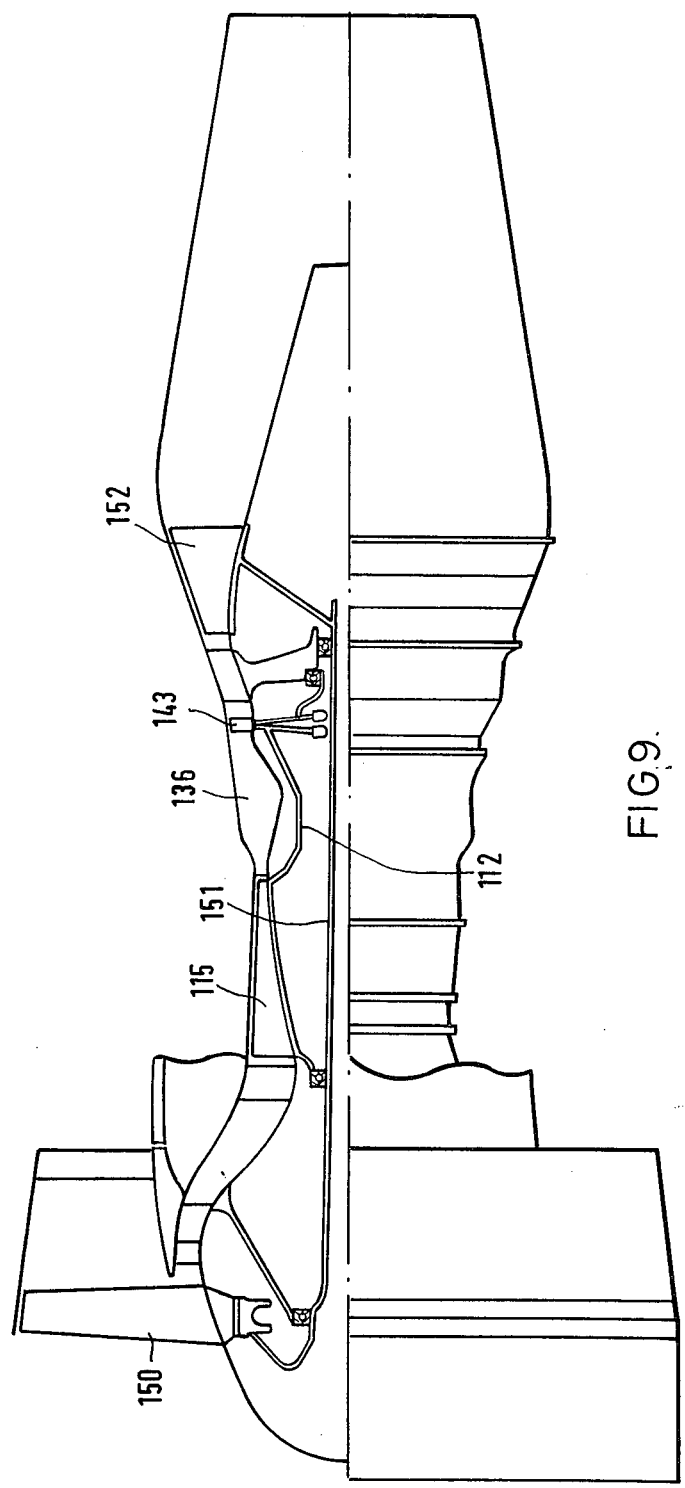
FIG. 9 is a side view, half in section, of a high bypass ratio engine including the gas generator of FIG. 7.

A typical application for the gas generator described above with reference to FIGS. 7 and 8, is to a high bypass ratio engine. Such an engine is shown in FIG. 9. The gas generator is diagrammatically shown and its compressor 115, combustion chamber 136, supersonic turbine 143 and shaft 112 are indicated. This engine has a large front fan 150 mounted on a low pressue spool or shaft 151 and driven by a low pressure turbine 152. In this engine the compressor 115 has an overall pressure ratio of about 16:1 and the fan 150 supercharges the air entering the compressor 115 by a ratio of about 1.6:1. The overall pressure ratio of the engine is therefore just over 25:1.

The gas generator of the present invention has a further advantage which increases the range of its applications. This advantage arises because the load characteristic of the supersonic turbine is relatively flat over a relatively wide range and the work required to drive a compressor having a presssure ratio as low as about 6:1 is still within the high efficiency range of operation of the supersonic turbine. Thus it is possible with a gas generator which has an overall pressure ratio of 16:1 to remove the first three stages of the compressor which typically have respective pressure ratios of 1.45:1; 1.4:1 and 1.3:1 so as to leave the gas generator with a pressure ratio of about 6:1. If the gas generator so modified is then used in a bypass engine having a front fan or series of low pressure stages which pre-pressurized the air entering the modified compresssor of the gas generator in a ratio of about 2.65:1, then the original flow conditions in compressor 115 will be restored and the gas generator will operate efficiently. In this case one or more of the remaining front stages of compressor 115 need variable stators to achieve matching in performance.

Figure 10:
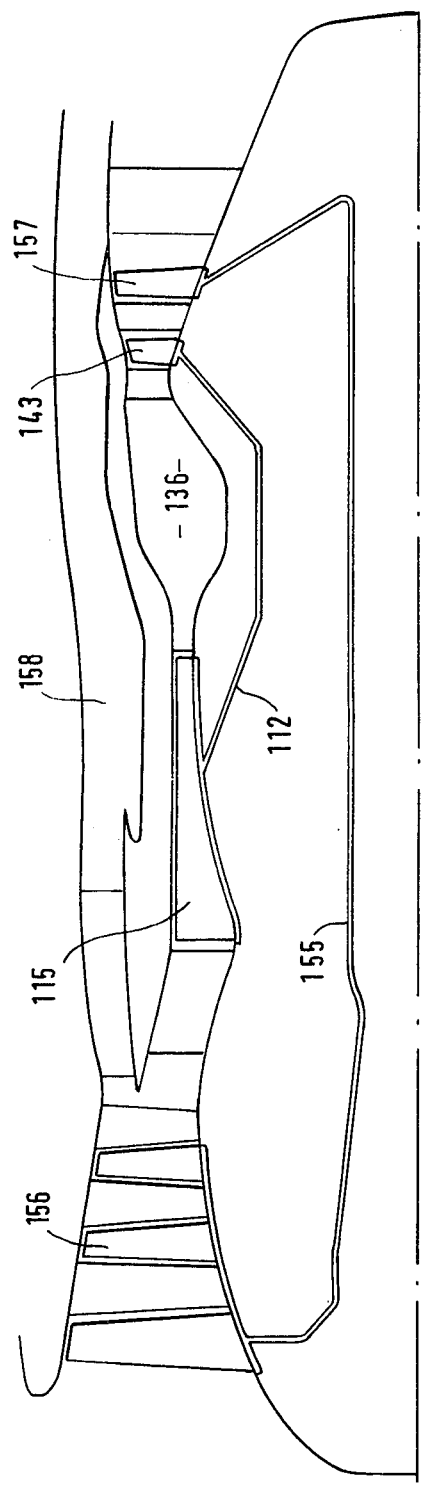
FIG. 10 is a diagrammatic half-section of a low bypass ratio engine including the gas generator of FIG. 7.

An engine of this kind having a bypass ratio of about 2:1 is shown in FIG. 10. In this case the low pressure spool is denoted at 155 and it carries a three stage fan 156 having a pressure ratio of about 2.5:1. Spool 155 is driven by low pressure turbine 157 and the engine has a bypass duct 158.

Figure 11:
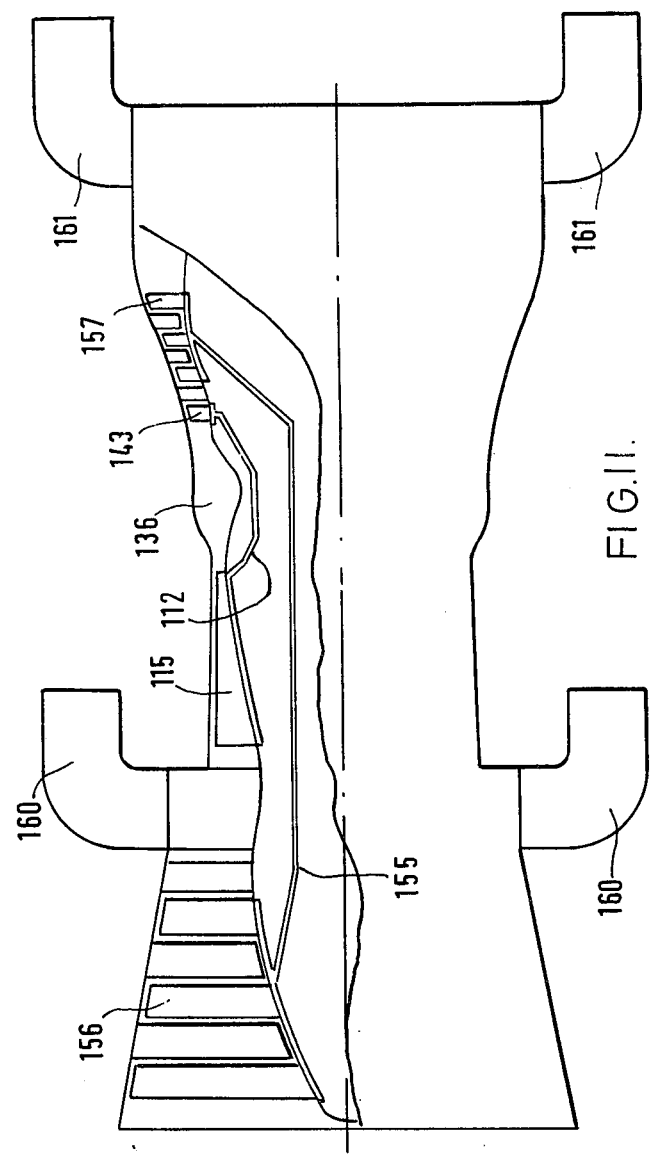
FIG. 11 is a plan view of a vectored thrust engine including the gas generator of FIG. 7 shown partly in section.

A similar engine to that shown in FIG. 10 is shown in FIG. 11. In this case the engine is a vectored thrust engine in which a portion of the fan delivery is directed out of a pair of front swivelling nozzles 160 while the turbine exhaust is directed out of two rear swivelling nozzles 161.

Figure 12:
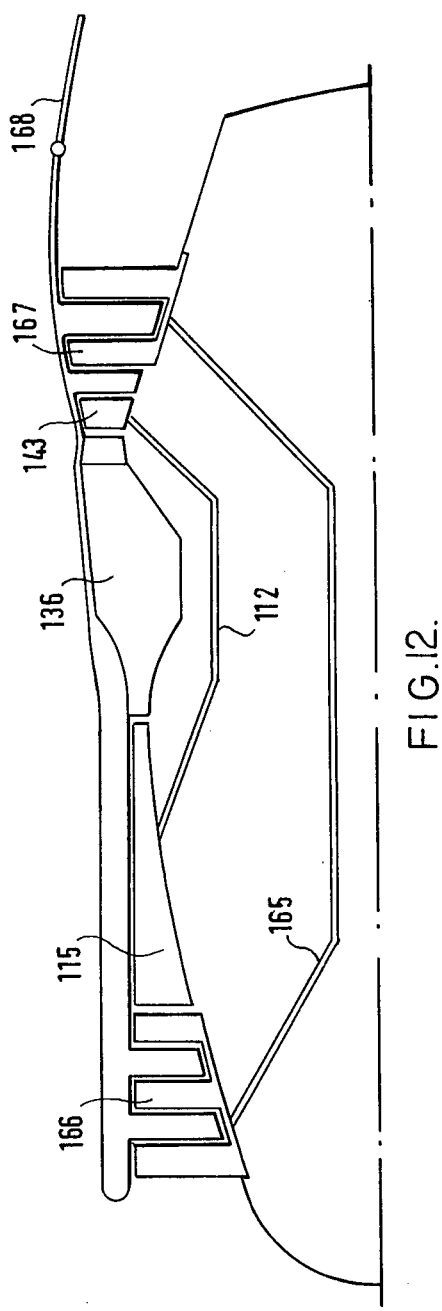
FIG. 12 is a diagrammatic half-section of a turbojet engine including the gas generator of FIG. 7.

FIG. 12 shows a two-spool turbojet engine suitable for a supersonic transport. In this engine the compressor 115 has only one of its stages removed and gives a pressure ratio of about 12:1. The low pressure spool 165 carries three compressor stages 166 giving a pressure ratio of about 2.1:1 and the overall pressure ratio of the engine is about 25:1. The low pressure spool 165 is driven by a low pressure turbine 167. The engine has a final nozzle 168.

I claim:
1. A gas turbine core engine or gas generator, comprising:
    a. a casing;
    b. a single shaft rotatably mounted upon said casing;
    c. a multistage compressor means mounted upon the shaft for compressing the gas;
    d. a plurality of stator vanes arranged in respective stages, which vanes are mounted on the casing and interdigitated with the stages of the compressor means;
    e. means carried on the casing for varying the angle of at least the stator vanes of one of said stages;
    f. an annular combustion chamber means, carried on the casing, for combusting the compressed gas with fuel and producing a flow of combustion products;
    g. stationary nozzle guide vane means for receiving the flow of combustion products from said combustion chamber means; and
    h. a single stage turbine means mounted on said shaft, said guide vane means delivering to said turbine means a flow of combustion products which is supersonic in relation to said guide vane means, and wherein said compressor means, said combustion chamber means and said nozzle guide means provide means for producing said supersonic flow.

2. The apparatus according to claim 1 wherein said single stage turbine means includes turbine blades and means enabling said turbine blades to rotate at a predetermined speed, the flow of combustion products entering said turbine means being at a speed which is subsonic relative to the speed of rotation of said turbine blades and leaving said turbine means at a speed which is supersonic relative to said turbine blades.

3. The apparatus according to claim 1 wherein said compressor means includes more than three stages and the first three stages of said compressor means are variable angle stages.

4. The apparatus according to claim 3 wherein said compressor means has nine stages.

5. The apparatus according to claim 1 wherein said compressor means has nine stages. .

6. The apparatus according to claim 1 wherein said compressor means has a compression ratio of about 25:1.

7. The apparatus according to claim 2 wherein said compressor means has a compression ratio of about 25:1.

8. The apparatus according to claim 3 wherein said compressor means has a compressor ratio of about 25:1.

9. The apparatus according to claim 4 wherein said compressor means has a ratio of about 25:1.

10. The apparatus according to claim 5 wherein said compressor means has a ratio of about 25:1.

\* \* \* \* \*